Aug. 10, 1926. 1,595,335
J. B. ATKINS
DEMOUNTABLE RIM
Filed March 2, 1921
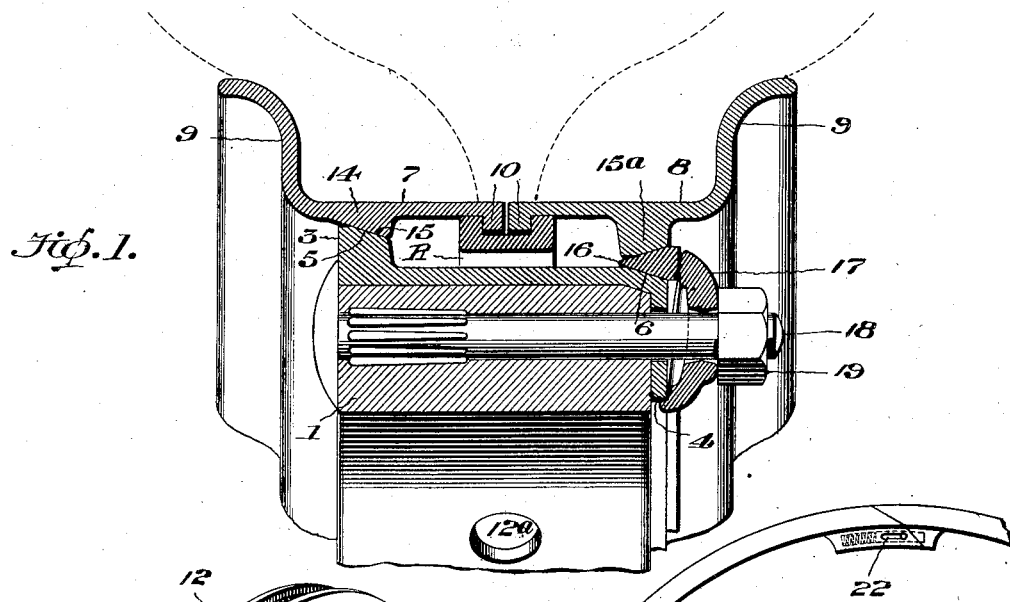
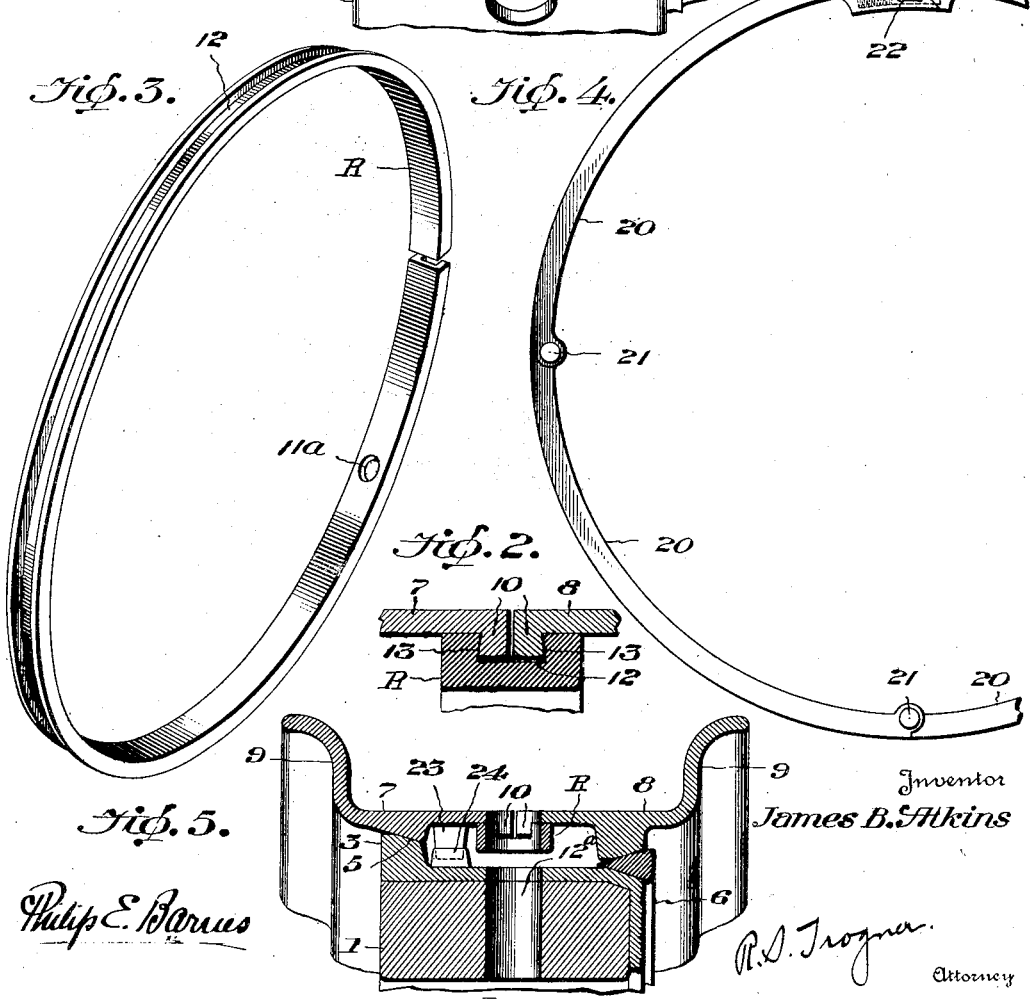

Patented Aug. 10, 1926.

1,595,335

UNITED STATES PATENT OFFICE.

JAMES B. ATKINS, OF AKRON, OHIO, ASSIGNOR TO THE GOODYEAR TIRE & RUBBER COMPANY, OF AKRON, OHIO, A CORPORATION OF OHIO.

DEMOUNTABLE RIM.

Application filed March 2, 1921. Serial No. 449,089.

My invention relates to improvements in rims for vehicle wheels, and more specifically to rims of the demountable type embodying permanent tire retaining flanges.

Referring to various types of demountable rims now in use, particularly those constructed with removable side rings or flanges, it frequently occurs that these side rings or flanges become accidentally displaced either owing to faulty construction, or the expansion of the tire, or the side thrust resulting from the weight of a load. In this contingency the tire is free to become detached from the rim with consequent disastrous results.

My invention is particularly designed to prevent the above enumerated disadvantages in rims as now constructed, and with this end in view contemplates the provision of a rim formed of complemental sections, each of which embodies a permanent tire engaging flange, the sections being securely locked together in such a manner that the expansion of the inflated tire tends to make the locking means more permanent and secure.

Furthemore, the invention provides a rim of particular utility when used to mount spare tires which it is desired to carry in their fully inflated condition, and to this end is designed to withstand the maximum pressure in a lateral direction when used in that capacity, while at the same time providing a structure upon which the tire may be quickly and securely mounted for ready attachment to the wheel felly.

The many advantages to be derived in the practice of the invention will become apparent when the following specification is read in conjunction with the accompanying drawing, in which:

Fig. 1 is a fragmentary, transverse sectional view illustrating a preferred embodiment of my invention, showing a portion of the tire in dotted lines;

Fig. 2 is a sectional view on a larger scale illustrating the particular form of locking means;

Fig. 3 is a perspective view of one of the members comprising the locking means;

Fig. 4 is a fragmentary side elevation showing a modified form of the locking means illustrated in Fig. 3; and Fig. 5 is a transverse sectional view, parts being broken away, of a modified type of rim comprehended by the invention.

Referring to the drawings by numerals, particularly to Figs. 1, 2, and 3 thereof, 1 designates the felly of a wheel of usual construction having mounted thereon a felly band of the type that is provided at one edge thereof with an annular outstanding flange 3, and, at its opposite edge, with an inturned annular flange 4. It will be noted that the outer face of the flange 3 provides an inclined shoulder 5, and that a correspondingly inclined shoulder 6 is formed at the opposite edge of the felly band.

The rim proper, as before mentioned, is formed of two annular sections 7 and 8, each of which is provided at its outer edge with an outstanding tire retaining flange 9. At their inner edges the sections 7 and 8 are each provided with an inturned locking flange 10 for a purpose which will presently become apparent.

These flanges 10 are adapted to be engaged by a split resilient locking ring R that is provided with an annular channel 12, shown in detail in Fig. 3. By means of the locking ring the sections 7 and 8 are held in aligned relation upon the base of the tire and against separation before the tire and rim are mounted upon the felly band. It will be noted, by particular reference to Fig. 2, that the walls of the channel 12 converge slightly toward the mouth of the channel, as indicated at 13, and that the outer side wall of each flange 10 is correspondingly inclined to provide an interlocking engagement between these flanges and the side walls 13. A slight clearance is provided for between the rim members 7 and 8 in order that the rim parts may be easily assembled. Obviously, however, when the tire is inflated, the members 7 and 8 separate and the above described locking engagement, between the flanges 10 and the side walls 13 of the ring R, will be effected and sustained through the tendency to separation of the bead portion of the tire. The usual valve opening is provided at 11ª in the ring 11 and at 12ª in the felly.

In order to properly retain the rim upon the felly band, the section 7 is provided with an annular inturned flange 14 that is formed with a peripheral face 15, of the proper inclination to engage the face 5 upon the shoulder 3, and the member 8 is similarly flanged, as indicated at 15ª, for engagement by a split annular member 16.

The annular member 16 is the rim retaining means, and is substantially of conventional form and therefore needs no further description.

As a means for keeping the rim retaining member in its proper position and wedging it between the shoulder 6 and the face of the flange 15ª, a plurality of clamps 17 are utilized, which are held upon the wheel by means of ordinary bolts 18 provided with nuts 19. It will be noted by reference to Fig. 1 that the inner portion of each clamp 17 is formed with a seat adapted to engage the inner peripheral edge of the felly band flange 4 while the outer edge thereof engages the side wall of the ring 16. By this means the clamp is prevented from turning upon the wheel, when the nut is tightened, and thus disengaging it from the rim retaining member 16.

Although I have shown and described the preferred type of locking ring R as being of the split resilient variety, the invention also comprehends other types of rings, such as that shown in Fig. 4.

In this modified form, the split ring comprises resilient sections 20 hinged together, as at 21, and provided with a spring pressed locking bolt 22.

In the modification shown in Fig. 5, the rim in its essential details is the same as that previously described, with the exception that the member 7 is provided with a lug 23 that is designed to engage a lug 24 upon the felly band to prevent creeping of the rim relatively to the felly band, all of which will be readily understood and needs no further description.

It will now be seen that the rim comprehended by my invention is particularly adapted for securely mounting heavy tires upon a wheel felly. Owing to its locking features and sectional construction, it is easily assembled together with the tire and is securely held with all parts in proper relation by the action of the tire itself, before and after it is mounted upon the felly.

While I have shown and described a preferred form of my invention and certain logical modifications thereof, it is to be understood that the invention is in no way limited by such disclosure except as specified in the appended claims.

What I claim is:

1. A demountable tire rim for vehicle wheels comprising similar annular complemental sections each having an outwardly extending tire retaining flange along one edge and an inwardly extending locking flange along the other edge, and a sectional locking ring comprising a plurality of hinged parts adapted to lock the rim sections together, said locking ring having a spring lock between two adjacent sections adapted to maintain the parts in locked relation, the pressure of air in the tire being adapted to maintain the rim sections in spaced relation.

2. A demountable tire rim for vehicles comprising similar annular complemental sections each having a tire retaining flange, an inwardly extending locking flange having its outer wall flared, and an intermediate inwardly extending inclined seating face, and a channeled locking ring having convergent side walls adapted to interlock with said locking flanges and comprising hinged sections and a spring latch between the unconnected ends thereof adapted to maintain the ring in place, the pressure of air in the tire being adapted to maintain the rim sections in spaced relation.

In witness whereof, I have hereunto signed my name.

JAMES B. ATKINS.